United States Patent Office 3,787,504
Patented Jan. 22, 1974

3,787,504
PROCESS FOR PREPARING ORGANIC DIPEROXIDES
Cesare Augusto Peri, Spartaco Fontani, and Franco Ladavas, Milan, Italy, assignors to Montecatini Edison S.p.A., Milan, Italy
No Drawing. Continuation-in-part of abandoned application Ser. No. 507,054, Nov. 9, 1965. This application Dec. 26, 1968, Ser. No. 787,243
Int. Cl. C07c 73/00
U.S. Cl. 260—610 R    6 Claims

ABSTRACT OF THE DISCLOSURE

An isomeric mixture of 60–70% of 1,3- and 40–30% of 1,4-isomers of $\alpha,\alpha'$-bis(di-tert.butylperoxy)diisopropylbenzene is prepared by reacting an isomeric mixture of 60–70% of 1,3- and 40–30% of 1,4-isomer of $\alpha,\alpha'$ dihydroxy - diisopropylbenzene with tert.butylhydroperoxide in the presence of di-tert.butylperoxide solvent and sulfuric acid catalyst.

CROSS-REFERENCES TO RELATED APPLICATIONS

This application is a continuation-in-part of our co-pending application Ser. No. 507,054, filed November 9, 1965, now abandoned.

BACKGROUND OF THE INVENTION

(1) Field of the invention

This invention relates to a process for preparing organic peroxides having a double peroxidic function. More particularly, it relates to a very economical process for preparing isomeric mixtures of diperoxides, especially alpha, alpha'-bis(di-tert.butylperoxy)diisopropylbenzene, and to the particularly advantageous isomeric mixtures thus produced.

(2) Description of the prior art

In application Ser. No. 160,665 filed on Dec. 19, 1961, there is described a process for preparing organic diperoxides having the general formula:

$$R_1 - \underset{\underset{R_3}{|}}{\overset{\overset{R_2}{|}}{C}} - O - O - \underset{\underset{R_5}{|}}{\overset{\overset{R_4}{|}}{C}} - Ar - \underset{\underset{R_7}{|}}{\overset{\overset{R_6}{|}}{C}} - O - O - \underset{\underset{R_3}{|}}{\overset{\overset{R_2}{|}}{C}} - R_1 \quad (I)$$

in which $R_1$ is selected from the group consisting of substituted and unsubstituted alkyl and aryl groups, the radicals $R_2$ to $R_7$ are substituted or unsubstituted alkyl groups containing 1 to 6 carbon atoms, and Ar is an aromatic group. This process comprises reacting, in glacial acetic acid solution, an alcohol having a double tertiary alcoholic function and a central aromatic nucleus, of the type

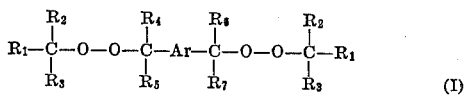

with a hydroperoxide of the type $$R_1 - \underset{\underset{R_3}{|}}{\overset{\overset{R_2}{|}}{C}} - OOH \quad (III)$$

in which $R_1$, $R_2$ to $R_7$ and Ar are as defined above in the presence of an acid condensing agent comprising perchloric acid. Example 1 of application Ser. No. 160,665 describes a condensation reaction between tert.butyl hydroperoxide and alpha,alpha' - (dihydroxy)-1,4-diisopropylbenzene with the formation of alpha,alpha'-bis(di-tert.butylperoxy) - 1,4 - diisopropylbenzene. The reaction is carried out in glacial acetic acid solution and in the presence of perchloric acid as the catalyst. The diperoxide prepared under these conditions is precipitated in crystalline form but remains partially dissolved in di-tert.butylperoxide, which substance is always present (in an amount of about 25%) in commercial tert.butyl hydroperoxide and which is insoluble in water.

In order to facilitate the recovery of the precipitated diperoxide, the mixture must be diluted with water before filtration thereof. Acetic acid and perchloric acid (which are relatively expensive substances—especially acetic acid due to the large amount used) cannot be recovered in an economically feasible manner from this diluted reaction mixture. Moreover, since some diperoxide remains mixed with di-tert.butylperoxide, which is insoluble in water, a further operation is required in order to remove the latter compound and purify the said diperoxide. A preferred method consists of dissolving the solid residue in methanol, from which, upon cooling, pure diperoxide crystals are precipitated. This method therefore is rather complex and costly.

In U.S. Pat. 3,118,866, issued Jan. 21, 1964 to R. S. Gregorian there are described bisperoxides having the general formula

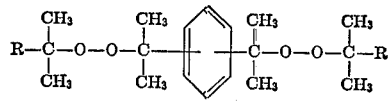

wherein R is methyl or phenyl. Gregorian indicates that these bisperoxides can be made by well known methods such as that described in JACS 68, p. 1938 (1946) in an article by N. A. Milas and L. H. Perry. That article indicates that the ditertiary alkyl (aliphatic) monoperoxides with which it is concerned were prepared from the corresponding tertiary alkyl hydroperoxides and tertiary alkyl hydrogen sulfates.

SUMMARY OF THE INVENTION

We have now discovered a simple and effective process for preparing the diperoxides in question, which process is much more efficient and economical than the prior art processes. We have further discovered, particularly in the production of alpha,alpha' - bis(ditert.butylperoxy) diisopropylbenzene, that this process results in a particularly advantageous 1,3-/1,4-isomeric mixture which is a superior vulcanizing agent for such polymeric materials as ethylene-propylene copolymers.

More particularly, the present invention provides a process for preparing an organic diperoxide consisting of a mixture of 60–70% of the 1,3-isomer and, correspondingly, 40–30% of the 1,4-isomer of alpha,alpha'-bis(di-tert.butylperoxy)diisopropylbenzene,

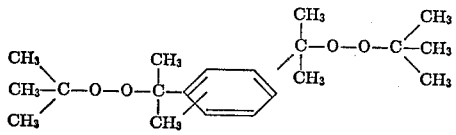

which process comprises reacting, at a temperature of from about −10 to 50° C., about 0.5 mol of an isomeric mixture of 60–70% of the 1,3-isomer and, correspondingly 40–30% of the 1,4-isomer of alpha,alpha'-dihydroxy-diisopropylbenzene,

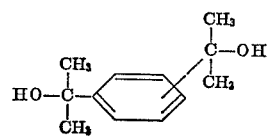

with about 1 mol tert.butyl hydroperoxide,

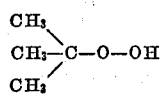

in the presence of di-tert.butylperoxide as the solvent and sulfuric acid, said sulfuric acid being present in an initial concentration of about 60–65%, and recovering the diperoxide from the reaction mixture by continuous countercurrent stripping of di-tert.butylperoxide with water vapor. The di-tert.butylperoxide is conveniently recycled for use as the solvent in the reaction. Preferably the reaction temperature is between −2° C. and +10° C.

In addition, the present invention provides, as a particularly economical and effective vulcanizing agent, an isomeric meta-para mixture of alpha,alpha'-bis(di-tert. butyl peroxy) diisopropylbenzene containing 60–70% of meta isomer and 40–30% of para isomer which mixture is obtained by the foregoing process.

DESCRIPTION OF THE PREFERRED EMBODIMENTS

A particular advantage afforded by the process of the present invention over the prior process results from the purification method, hereinafter described in greater detail, which purification method permits the preparation of a meta/para isomeric mixture of alpha,alpha'-bis(di-tert.butylperoxy)diisopropylbenzene comprising 60–70%, preferably 65%, of meta isomer and 40–30%, preferably 35%, of para isomer. This affords a significant technological and economic advantage as regards the preparation of the intermediates for the condensation reaction between the hydroperoxide and the tertiary dialcohol in the preparation of the diperoxides. In particular, the tertiary dialcohol is prepared by alkylation of benzene with propylene (which alkylation under the presently employed conditions of the process leads, in fact, to the formation of a mixture of meta and para diisopropyl benzenes in a ratio of about 65/35), followed by oxidation of these products to the corresponding hydroperoxides and finally reduction to the respective dialcohols. Since this mixture of the meta and para isomers can now be used in the condensation reaction, the need for separation of the isomers is obviated.

Moreover, by using di-tert.butylperoxide, preferably in an amount of from 0.85 to 2 moles per 0.5 mol of isomeric dialcohol mixture (which di-tert.butylperoxide, as mentioned above, is present in commercial tert.butylhydroperoxide in an amount of about 25% by weight) as the solvent in the process of the present invention for the preparation of the 1,3- and 1,4-isomers of alpha, alpha'-bis(di-tert.butyl peroxy) diisopropylbenzene, further considerable technological and economic advantages are achieved. Thus, the di-tert.butylperoxide, in contrast with the glacial acetic acid used as the solvent in the process of application Ser. No. 160,665, can be easily recovered from the reaction product and recycled to the condensation reaction.

In addition, the use of sulfuric acid, in an initial concentration of about 60–65%, as the catalyst instead of the perchloric acid used in the condensation reaction process of said application Ser. No. 160,665 affords considerable cost savings, since sulfuric acid is much less expensive than perchloric acid, while at the same time affording excellent yields. The final concentration of the $H_2SO_4$ (after the reaction is completed) is from about 55 to 60%. In addition to acting as the reaction catalyst, the $H_2SO_4$ serves to take up the water released by the reaction, thus facilitating separation into aqueous and organic layers and the subsequent economical recovery of the reaction product and solvent.

In accordance with a preferred feature of the invention, the amount of sulfuric acid having an initial concentration of 60–65% added to the reaction mixture is from about 2 to about 3.5 moles per 0.5 mol of the isomeric dialcohol mixture, and more preferably from about 2.6 to about 3.3 moles per 0.5 mol of the dialcohol mixture.

In accordance with another preferred feature, the amount of di-tert.butylperoxide is between about 0.85 and 2 moles per 0.5 mol of the isomeric dialcohol mixture.

The reaction may be carried out at a temperature of from about −10 to +50° C. and preferably from −2 to +10° C. Generally, at least two mols of hydroperoxide are employed per mol of the dialcohol, so as to provide from the stoichiometric amount to a slight excess of the hydroperoxide reactant.

The diperoxide formed by the condensation process of the invention is dissolved in di-tert.butylperoxide, which also serves to protect it against acid degradation. To recover the diperoxide, countercurrent stripping is employed. Preferably, the mixture is diluted with water to obtain two layers. The upper layer comprises the diperoxide dissolved in di-tert.butylperoxide. The lower layer comprises aqueous $H_2SO_4$. The lower layer is removed. The upper organic layer is washed with water, with an aqueous NaOH solution having a concentration from 1% to 10% and then again with water until neutral and is thereafter fed in droplet form into the top of a column packed with Raschig rings and passed in countercurrent contact with water vapor at about 100° C. The water vapor entrains di-tert.butylperoxide which is then recycled without any purification operation. Pure diperoxide is thus obtained.

The instant process, in contrast to those of the prior art, makes possible the continuous separation and purification of the diperoxide. In addition, the isomeric mixtures of meta and para alpha,alpha'-bis(di-tert.butylperoxy) diisopropylbenzene are purified without product losses and without altering their relative proportions. Thus, the meta isomer is much more soluble in methanol than the para isomer; and purification in methanol was required by the process of application Ser. No. 160,665, whereby unsatisfactory yields of meta isomer and modified ratios of the two isomeric forms were obtained. Further, the process of the present invention simplifies the purification of the diperoxide, for the steps of dissolving the mixture of diperoxide and di-tert.butylperoxide in methanol, cooling the solution thus obtained, filtering and then drying the crystals are replaced by the step of separating the diperoxide directly from the di-tert.butylperoxide solution by countercurrent stripping with water vapor. This countercurrent stripping, which is a continuous process, enables the contact time of alpha,alpha'-bis(di-tert.butylperoxy) diisopropylbenzene and di-tert.butylperoxide with water vapor (at about 100° C.) to be reduced to a minimum. This avoids harmful effects of prolonged heating of the products which, although relatively stable, have a peroxidic nature and can therefore undergo violent decomposition.

The following examples are presented to further illustrate the invention without limiting its scope.

EXAMPLE 1

456 g. of 62.5% $H_2SO_4$ (2.91 moles) and 256 g. of di-tert.butylperoxide (1.75 moles) (recovered from a prior operation) were introduced into a 2-liter glass flask provided with a propeller agitator rotating at 350 r.p.m., a dipping thermometer, a hydraulic seal valve, a gas-inlet pipe, and funnel immersed in a brine cooling bath (−8° to −12° C.). (When industrial quantities of reactants are to be handled, a bigger enameled or glass-lined steel reactor must be employed.) The temperature of the mixture was adjusted to 0° C. and 123 g. of 75% tert.butyl hydroperoxide and 101 g. of a meta-para isomeric mixture of 96–96.5% dihydroxydiisopropylbenzene (0.5 mol) were added thereto. The mixture was agitated under an inert $CO_2$ atmosphere for about 1 hour at a temperature of 0 to 3° C. 400 g. of water at a temperature of 85 to 90° C. were quickly introduced into the reaction mixture, whereupon immediate separation into a lower aqueous layer and an upper organic layer took place. The lower layer was discarded. The upper layer was washed with water, neutralized with 500 g. of an aqueous NaOH solution having a concentration of about 4% and washed again with water.

Thereafter, the organic solution, which weighed 422 g. and consisted of a 35% solution of 1,3- and 1,4-isomers of alpha,alpha'-bis(di - tert.butylperoxy) diisopropylbenzene in di-tert.butylperoxide, was fed, in countercurrent contact with water vapor at about 100° C., into the top of a glass column (about 90 cm. high and having a diameter of 2.8 cm.) packed with Raschig rings. The column was strongly insulated by a thick layer of glass fiber rovings. (Similar results can be obtained with other types of columns, for instance stainless steel, glass-lined or enameled steel columns or the like; furthermore Berl saddles may replace the Raschig rings or else bubble cap towers may be employed.) Water vapor at 100° C. was introduced into the bottom of the column at such rate as to obtain a weight ratio of water vapor to the organic solution of from about 1:1 to 4:1. The countercurrent distillation with steam was completed in about 1 hour.

Di-tert.butylperoxide was recovered from the distillate, while a mixture of condensed water and the 1,3- and 1,4-isomers of alpha,alpha'-bis(di-tert.butylperoxy) diisopropylbenzene was collected at the base of the column. The mixture was heated to 55° C., totally melting the diperoxide, and carefully separated. 153 g. of the 1,3- and 1,4-isomers of alpha,alpha'-bis(di-tert.butylperoxy) diisopropylbenzene ($H_2O$ content=about 4.25%) were obtained. The yield of the anhydrous product was 86.6%.

Examples 2 to 9 illustrate the criticality of the initial $H_2SO_4$ concentration for obtaining maximum diperoxide yields.

EXAMPLE 2

The procedure set forth in Example 1 was repeated, the only exception being that the initial $H_2SO_4$ concentration was decreased to 57%. Thus, to 500 g. of 57% $H_2SO_4$ (2.91 moles) and 256 g. of di-tert-butylperoxide (recovered from a prior operation), 123 g. of 75% tert-butyl hydroperoxide and 101 g. of a meta-para isomeric mixture of 96–96.5% di-hydroxydiisopropylbenzene (0.5 mol) were added at 0° C. and the mixture was stirred at 350 r.p.m. for one hour at 0 to 3° C.

Only 124 g. of the 1,3- and 1,4-isomers of alpha,alpha'-bis(di-tert.butylperoxy) diisopropylbenzene ($H_2O$=about 3.8%) were obtained, corresponding to a 70.4% yield, which is about 20% lower than the 86.6% yield achieved in Example 1.

EXAMPLE 3

Example 1 was repeated, but the $H_2SO_4$ concentration was increased. Thus, 407 g. of 70% $H_2SO_4$ were added to the reaction mixture. Only 121.8 g. (100% anhydrous product) of the 1,3- and 1,4-isomers of alpha,alpha'-bis-(di-tert-butylperoxy) diisopropylbenzene were obtained, corresponding to a 72% yield (against a yield of 86.6% achieved in Example 1).

EXAMPLES 4–9

As in Examples 2 and 3, Example 1 was repeated in each of Examples 4–9, employing the same total amount of $H_2SO_4$ but varying the $H_2SO_4$ concentrations. In particular, $H_2SO_4$ concentrations of 10%, 30%, 50%, 61%, 65% and 73% were employed in Examples 4–9, respectively.

The results, as well as comparative data of the other examples, are reported in Table 1, which clearly demonstrates that an initial concentration of about 60–65% is necessary in order to obtain the highest yields.

Examples 10 and 11 illustrate that amounts of $H_2SO_4$ between about 2 and 3.5 moles per 0.5 mol of dialcohol, while maintaining the acid concentration, preferably between 60% and 65%, are required in order to achieve high yields of diperoxide.

EXAMPLE 10

Example 1 was repeated with the exception that 228 g. of 62.5% $H_2SO_4$ (nearly 1.45 moles) (instead of 456 g., i.e., the 2.91 moles of Example 1) were added to the reaction mixture.

Only 115 g. of anhydrous 1,3- and 1,4-isomers of alpha, alpha'-bis(di-tert-butylperoxy) diisopropyl benzene were obtained, corresponding to a 68% yield.

EXAMPLE 11

Example 10 was repeated but varying the molar ratio of $H_2SO_4$ to other reactants, without changing the acid concentration. That is, 114 g. of 62.5% $H_2SO_4$ (nearly 0.72 mole) were added to the reaction mixture.

Only 94.7 g. of anhydrous 1,3- and 1,4-isomers of alpha, alpha'-bis(di-tert-butylperoxy) diisopropylbenzene were obtained, corresponding to a 56% yield.

EXAMPLE 12

Example 10 was repeated, but varying the molar ratio of $H_2SO_4$ to other reactants, without changing the acid concentration. That is, 634 g. of 62.5% $H_2SO_4$ (4 moles) were added to the reaction mixture.

138.8 g. of anhydrous 1,3- and 1,4-isomers of alpha, alpha'-bis(di-tert-butylperoxy) diisopropylbenzene were obtained, corresponding to a 82% yield. The so obtained product showed an objectionable brownish coloration, owing to the formation of by-products formed by the partial decomposition of the peroxide caused by the high excess of the $H_2SO_4$.

Examples 13 and 14 illustrate the criticality of the use of di-tert-butylperoxide as the solvent in the reaction.

EXAMPLE 13

Example 1 was repeated, but substituting a different solvent for the di-tert-butylperoxide. In this example 256 g. of benzene were employed as the solvent for the reaction mixture. Only 130.0 g. of the 1,3- and 1,4-isomers of alpha,alpha'-bis(di-tert-butylperoxy) diisopropylbenzene ($H_2O$=2.9%) were obtained, corresponding to a 75% yield.

The product was dark-colored and dirty and could not be commercialized without difficult and lengthy purification operations which reduce the yield and increase the product cost.

From the top of the stripping column about 250 g. of benzene and 30 g. of di-tert-butylperoxide were obtained; this latter came from the original 123 g. of tert-butyl hydroperoxide, which had a 75% degree of purity.

The presence of di-tert-butylperoxide in the column head when its recycle is not provided for requires a further rectification process, in order to recover the benzene solvent.

EXAMPLE 14

Example 1 was repeated but substituting 256 g. of n-hexane for the di-tert-butylperoxide as the solvent for the reaction mixture.

Only 122 g. of the 1,3- and 1,4-isomers of alpha,alpha'-bis(di - tert - butylperoxy) diisopropylbenzene ($H_2O$= 3.1%) were obtained, corresponding to a 70% yield.

The product and the process had the same disadvantages mentioned in Example 13.

Examples 1–14 are summarized in the following Table I.

TABLE I

| Ex. | H$_2$SO$_4$ Concentration, percent | Moles | Dialcohol, moles | Hydroperoxide, moles | Solvent | Diperoxide yield, percent |
|---|---|---|---|---|---|---|
| 1 | 62.5 | 2.91 | 0.5 | 1 | Di-tert-butyl-per. | 86.6 |
| 2 | 57 | 2.91 | 0.5 | 1 | ___do___ | 70.4 |
| 3 | 70 | 2.91 | 0.5 | 1 | ___do___ | 72 |
| 4 | 10 | 2.91 | 0.5 | 1 | ___do___ | 35.4 |
| 5 | 30 | 2.91 | 0.5 | 1 | ___do___ | 65.7 |
| 6 | 50 | 2.91 | 0.5 | 1 | ___do___ | 64.2 |
| 7 | 61 | 2.91 | 0.5 | 1 | ___do___ | 85.0 |
| 8 | 65 | 2.91 | 0.5 | 1 | ___do___ | 84 |
| 9 | 73 | 2.91 | 0.5 | 1 | ___do___ | 69 |
| 10 | 62.5 | 1.45 | 0.5 | 1 | ___do___ | 68 |
| 11 | 62.5 | 0.72 | 0.5 | 1 | ___do___ | 56 |
| 12 | 62.5 | 4 | 0.5 | 1 | ___do___ | 82 |
| 13 | 62.5 | 2.91 | 0.5 | 1 | Benzene | 75 |
| 14 | 62.5 | 2.91 | 0.5 | 1 | n-Hexane | 70 |

EXAMPLE 15

In the vulcanization of ethylene-higher-alpha olefin copolymers, including ethylene-propylene copolymers and ethylene-propylene-unconjugated diene terpolymers, the isomeric peroxide mixtures of the present invention provide superior vulcanizates. Table II summarizes typical vulcanization runs on vulcanization mixtures employing 100% meta isomer, 100% para isomer, and an isomeric mixture of the present invention. Superior mechanical properties are achieved when the vulcanizate is produced with an isomeric diperoxide mixture of the present invention. The vulcanization is carried out at a temperature of 165° C. during 60 minutes.

TABLE II

| Mixture: | | | |
|---|---|---|---|
| Ethylene-propylene copolymer having a propylene content of 45% by moles and a viscosity ML(1+4) 100° C. = 35, g | 100 | 100 | 100 |
| HAF carbon black, g | 50 | 50 | 50 |
| Sulfur, g | 0.3 | 0.3 | 0.3 |
| 1,4-α-α'-bis(tert.butylperoxy).diisopropyl-benzene, mol | 0.00481 | | |
| 1,3-α-α'-bis(tert.butylperoxy).diisopropyl-benzene, mol | | 0.00481 | |
| Mixture of 65% 1,3- and 35% 1,4-α-α'-bis (tert.butylperoxy) diisopropylbenzene, mol | | | 0.00481 |
| Mechanical characteristics of the vulcanized products: | | | |
| Mooney scorch time at 165° C | 3'15" | 3'02" | 3'10" |
| Tensile strength, kg./cm.² | 210 | 205 | 225 |
| Elongation at break, percent | 410 | 395 | 445 |
| Modulus at 300%, kg./cm.² | 129 | 125 | 127 |
| Residual elongation at 200% | 7.5 | 6.5 | |

Another substantial advantage of using the peroxide mixture according to the invention over the use of either one of the pure meta(1,3) or para(1,4) isomeric bisperoxide appears in the preparation of homogeneous mixes on the basis of ethylene-propylene copolymers and terpolymers, and of other natural or synthetic rubbers; it is known that before vulcanization many ingredients such as fillers, vulcanizing agents, lubricants and so on have to be homogeneously admixed to the basic rubber. The preparation of said mixture has to be carried out under such conditions as to avoid scorching phenomena in particular at the lowest possible temperature. Now, since the bisperoxide mixture according to the invention shows a melting point of about 40° C. (as compared to a melting point of 78° C. of the para and of 52° C. of the meta isomer) it allows the preparation of very homogeneous vulcanizable mixes at the lowest possible temperature with the nearly absolute absence of scorching phenomena.

As previously noted, the isomeric mixture of the present invention also finds highly advantageous application in the vulcanization of ethylene-propylene-non-conjugated diene terpolymers. The non-conjugated diene termonomers that may be employed are well known in the art and include, by way of example, 1,4-hexadiene, dicyclopentadiene, ethylidene-norbornene, methylenenorbornene, methyltetrahydroindene, and the like. See, e.g., the list set out in "Macromolecules," vol. 1, No. 4, July–August 1968, at p. 362.

Variations can, of course, be made without departing from the spirit of the invention.

Having thus described our invention, what we desire to secure by Letters Patent and hereby claim is:

1. A process for preparing an organic diperoxide consisting of a mixture of 60–70% of the 1,3-isomer and, correspondingly, 40–30% of the 1,4-isomer of alpha, alpha'-bis(di-tert.butylperoxy) diisopropylbenzene,

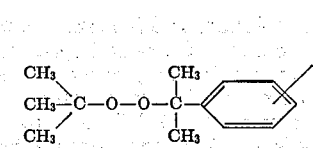

which process comprises reacting, at a temperature of from about −10 to +50° C., about 0.5 mol of an isomeric dialcohol mixture of 60–70% of the 1,3-isomer and, correspondingly, 40–30% of the 1,4-isomer, of alpha,alpha'-dihydroxy-diisopropylbenzene,

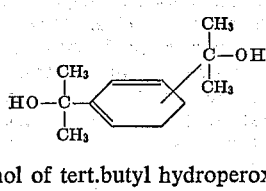

with about 1 mol of tert.butyl hydroperoxide,

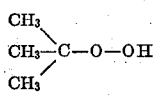

in the presence of di-tert.butylperoxide as the solvent and sulfuric acid, said sulfuric acid being present in an amount of from about 2 to about 3.5 moles per 0.5 mol of said isomeric dialcohol mixture and having an intial concentration of about 60–65%, to form a reaction mixture, neutralizing said reaction mixture diperoxide from the reaction mixture by continuous countercurrent stripping of di-tert.butylperoxide with water vapor.

2. The process of claim 1 wherein the amount of said sulfuric acid is from about 3.5 to 2.5 moles per 0.5 mol of said isomeric dialcohol mixture.

3. The process of claim 1 wherein the amounts of said di-tert.butylperoxide is from 0.85 to 2 moles per 0.5 mol of said isomeric dialcohol mixture.

4. The prcess of claim 1 wherein said di-tert.butylperoxide is recycled from said recovery step for use as solvent in said reaction.

5. The process of claim 1 wherein said isomeric mixture contains about 65% of said meta isomer and about 35% of said para isomer.

6. The process of claim 1 wherein said reaction temperature is from about −2 to +10° C.

References Cited
UNITED STATES PATENTS
3,118,866  1/1964  Gregorian _____ 260—610 R
3,402,205  9/1968  Gregory _____ 260—610 R
2,668,180  2/1954  Boardman _____ 260—610 R OTHER REFERENCES
Nicholas A. Milas et al., "Jour. Amer. Soc.," vol. 68, pp. 1938–1940 (1946).

BERNARD HELFIN, Primary Examiner
W. B. LONE, Assistant Examiner

U.S. Cl. X.R.
260——79.5 P; 252—188.3